May 20, 1969     A. C. SCHULZ     3,445,548
PROCESS FOR MANUFACTURING TRIALKYL PHOSPHITE
Filed Aug. 21, 1967
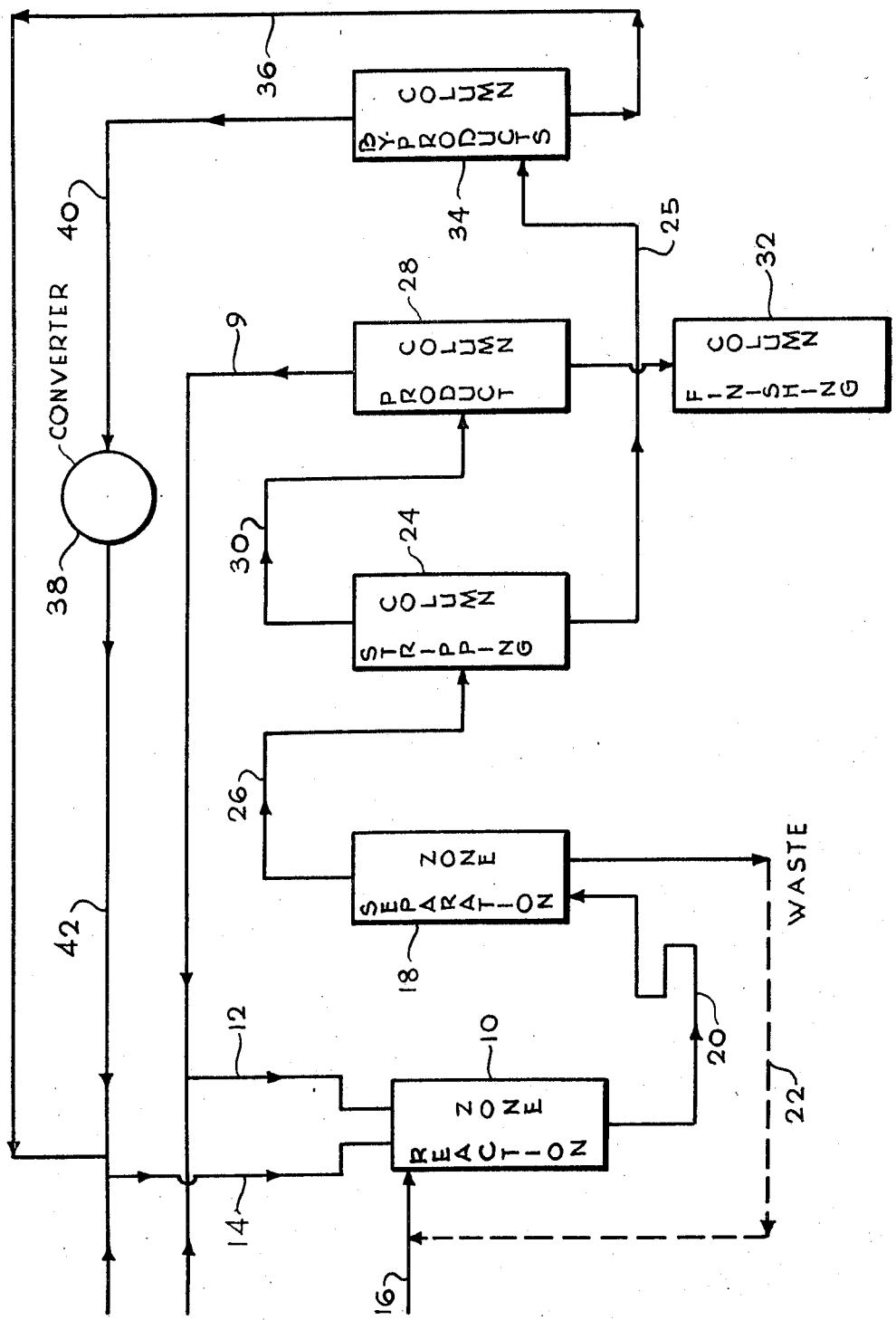

United States Patent Office 3,445,548
Patented May 20, 1969

3,445,548
PROCESS FOR MANUFACTURING
TRIALKYL PHOSPHITE
Arthur C. Schulz, North Tonawanda, N.Y., assignor to Hooker Chemical Corporation, Niagara Falls, N.Y., a corporation of New York
Continuation-in-part of application Ser. No. 284,493, May 31, 1963. This application Aug. 21, 1967, Ser. No. 661,926
The portion of the term of the patent subsequent to Aug. 17, 1982, has been disclaimed
Int. Cl. C07f 9/08, 9/12
U.S. Cl. 260—982                                10 Claims

ABSTRACT OF THE DISCLOSURE

Trialkyl phosphites are made by reacting an aryl phosphite with an alkanol in the presence of a transesterification catalyst, separating the catalyst and nonvolatile byproducts from the rest of the reaction mixture, by vaporizing off the volatiles and leaving the catalyst and non-volatile byproducts as a residue, and then separating the desired trialkyl phosphite from the other vaporized volatile materials.

In a preferred embodiment, trimethyl phosphite is made from triphenyl phosphite and methanol in the presence of a sodium alcoholate catalyst.

---

This invention relates to the preparation of esters of phosphorous acid. More particularly, it relates to the preparation of trialkyl phosphites, such as trimethyl phosphite.

This is a continuation-in-part of U.S. patent application S.N. 284,493, filed May 31, 1963, now U.S. Patent 3,337,657, which was a continuation-in-part of U.S. patent application S.N. 174,334, filed Jan. 28, 1962, now U.S. Patent 3,201,435.

It is known to prepare lower alkyl triesters of phosphorous acid by transesterification. For example, trimethyl phosphite may be prepared by reacting methanol with a triorgano-phosphite containing at least one aromatic radical and recovering the desired lower trialkyl phosphite by distillation. Although the yields obtainable have been for the most part satisfactory, practice of the instant invention makes high yields of the lower trialkyl esters of phosphorous acid more readily obtainable.

It has been discovered that by the improved process for preparing lower trialkyl phosphites of this invention the quantity of byproducts which may normally be formed is minimized, to give increased yields of the lower trialkyl phosphite. In accordance with this invention it has been discovered that lower trialkyl phosphites may be prepared by passing into a reaction zone a mixture of a phosphorus-containing compound of the general formula:

P(OR)₃ where R is alkyl, aryl or mixture thereof, with at least one phosphorous valence being satisfied by an oxyaryl radical, a lower alkyl alcohol and a transesterification catalyst, removing said catalyst from said mixture and recovering a lower trialkyl phosphite from the resultant reaction mixture. In the practice of this invention it has been found that the production of byproducts is minimized by removal of the catalyst prior to the recovery of the desired lower trialkyl phosphite, apparently because the rate of back-transesterification is thereby minimized. It has also been found that some byproducts formed during the reaction may be recycled and utilized in the preparation of additional desired lower trialkyl phosphite, once the catalyst and desired product have been removed from the process stream.

The accompanying drawing illustrates the preferred process of the invention. It is to be understood that this process may be suitably conducted utilizing alkyl alcohols containing between about 1 and 7 carbon atoms, but is preferably conducted with methanol.

Referring to the drawing, which is a block diagram of the preferred process of the invention, 10 is a reaction zone through which is passed a lower alkyl alcohol, a phosphorus containing compound and a transesterification catalyst from sources, not shown, by conduits 12, 14 and 16, respectively. To the reaction zone is added a catalytic amount of a transesterification catalyst through conduit 16, concomitantly with the other reactants. The stream of the reaction mixture is then conveyed to a separation zone 18 through conduit 20. Under the conditions prevailing in the separation zone 18 the reaction products are removed from the catalyst and nonvolatile byproducts. The catalyst and the non-volatile byproducts may then be recycled to reaction zone 10 via recycle conduit 22 and conduit 16, but are usually removed from the system as waste. The reaction products free of catalyst may then be transferred to stripping column 24 by conduit 26. In the stripping column 24 the lower boiling trialkyl phosphite and lower alkyl alcohol may be separated from the higher boiling byproducts. For purposes of this invention, lower boiling products are considered to be the desired trialkyl phosphite and products having boiling points, under the prevailing conditions, lower than the trialkyl phosphite. Higher boiling byproducts are those products which have a higher boiling point than the desired trialkyl phosphite. The lower boilers are then separated in product column 28 to recover the desired lower trialkyl phosphite after being conveyed thereby conveyor means 30. Other means for separating aliphatic alcohols may also be utilized in the practice of this invention. The recovered phosphite product if so desired, may then be further purified in finishing column 32. The recovered alcohol is recycled to reaction zone 10 via conduits 29 and 12. Byproducts column 34 receives the byproducts of the reaction and separates the aromatic byproducts containing hydroxyl groups from other byproducts. The byproducts, other than the aromatic byproducts containing hydroxyl groups, are recycled to the reaction zone 10 via conduit 36, while the aromatic byproduct containing hydroxyl groups is conveyed to converter 38 via conduit 40 where triaromatic phosphite may be formed, which may then be conveyed to reaction zone 10 via conduits 42 and 14.

When conducting the process of this invention with methanol, ethanol or isopropyl alcohol and triphenyl phosphite the catalyst and non-volatile byproducts may be removed by means of flash vaporization. Following such procedure, the separation or catalyst remover column 18 is placed under sub-atmospheric conditions and a temperature so that the reaction mixture entering the separation column 18 via conduit 20 is passed from substantially atmospheric pressure to an area of reduced pressure which causes immediate total vaporization of the products and volatile byproducts formed in the reaction zone 10, but does not vaporize the catalyst or non-volatile byproducts. The catalyst which is in the reaction mixture and the non-volatile material will remain in the separation zone 18 to be removed or recycled if desired, as indicated above. In the stripping column 24 the trialkyl phosphite and the respective alcohol are removed to the product column 28 by maintaining conditions in stripping column 24 which will vaporize the trialkyl phosphite but do not vaporize the byproducts which have higher boiling points. The byproducts which comprise essentially phenol, dialkyl phenyl phosphite and diphenyl alkyl phosphite and which boil higher than the trialkyl phosphite, are conveyed via conduit 25 to byproduct column 34, where phenol is recovered and recycled as indicated above and the byproducts are recycled to the reaction zone.

The reaction zone 10 of the invention may be maintained at a temperature below or about the boiling point of the trialkyl phosphite under the prevailing conditions. It has been found that the reaction zone 10 may be maintained at about the refluxing temperature of the reaction mixture, but a temperature of between 15 and 150 degrees centigrade may also be employed. However, satisfactory results may be obtained utilizing a temperature of between about 25 and 135 degrees centigrade. It is preferred that the temperature in the reaction zone, be maintained at between about 85 and 95 degrees centigrade when utilizing ethanol and isopropyl alcohol and about between 55 and 75 degrees centigrade when utilizing methanol. The reactants are fed into reaction zone 10 at a rate to maintain an excess of alcohol. The ratio of alcohol to the phosphorous containing composition may be about from 3:1 to 15:1, it being desired to maintain the equilibrium of the reaction

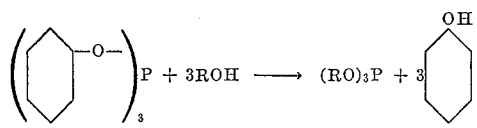

as far to the right as possible. Thus, ratios of between about 3:1 to 9:1 are preferred. In the reaction zone the reaction of the triphenyl phosphite and alkanol may be only partially completed. In said cases, the reaction mixture reaches equilibrium as it passes through conduit 20, which is maintained within the temperature ranges set for the reaction zone 10.

The products and byproducts of the reaction are then passed into the separation zone or column 18 which, in an embodiment of this invention, comprises a zone maintained under reduced pressure to volatilize or "flash vaporize" all reactants and byproducts, but essentially avoiding the vaporization of the catalyst and non-volatile byproducts as set forth above. Instead of flash vaporizing, one may vaporize by application of heat to produce a vaporization and separation temperature or may draw a vacuum to cause the separation over a short time, e.g., 5 seconds to about 10 minutes. The vapor flow is then carried over to the stripping column 24, leaving substantially all the catalyst and nonvolatile byproducts in the separating column. The separation column 18 of the invention is maintained at a temperature and pressure which will minimize the buildup of catalytic residue. Generally a temperature of between about 20 and 150 degrees centigrade, at a pressure of from 1 to 750 mm. of mercury may be utilized in the separation zone 18, it being preferred however, to utilize a temperature of between about 20 and 125 or 150 degrees centigrade at 25 to 200 mm. of mercury. The temperature and pressure in the stripping column 24 is maintained within a range to effectuate the separation of lower trialkyl phosphite and lower boiling substances from the higher boilers. Temperatures in the range from between about 20 and 140 degrees centigrade have been found satisfactory when utilizing atmospheric or subatmospheric pressures. The product column 28 is maintained at a temperature, under prevailing conditions which will effectuate the separation of the lower trialkyl phosphite from other lower boilers. Generally a temperature between about 55 and 140 degrees centigrade may be utilized when atmospheric or subatmospheric pressures are imposed on the column. The byproduct column 34 may be operated at a temperature and pressure which separates the aromatic byproduct from other byproducts. In the preferred process of this invention the phenol column 34 is maintained at a temperature between about 60 and 135 degrees centigrade at subatmospheric pressure.

Although the above description illustrates the utilization of flash vaporization to remove the catalyst from the reaction mixture to minimize back transesterification and decrease the rate of reaction, other means may possibly be utilized to decrease the rate of reaction, e.g., neutralization of the catalyst, filtering of the catalyst, by ion exchange membrane and so forth.

Illustrative of the phosphorus containing compounds which may be utilized in the practice of this invention are aryl dialkyl phosphites, such as phenyl dimethyl phosphite, o,m,p,-cresol diethyl phosphite, 2,3,6-trimethylphenyl diisopropyl phosphite, 6-ethyl-2-methylphenyl dibutyl phosphite, phenyl dihexyl phosphite, etc., diaryl alkyl phosphites, such as diphenyl ethyl phosphite, di(3,4-dimethylphenyl)butyl phosphite, di(trimethylphenyl)pentyl phosphite, di-(3-ethyl-4-methylphenyl)hexyl phosphite, etc., triaryl phosphites, such as triphenyl phosphite, tricresyl phosphite, tri(5-ethyl-2-methylphenyl)phosphite, etc., and mixtures of the aryl dialkyl phosphites, diaryl alkyl phosphites and trialkyl phosphites.

Transesterification catalysts known to the art may be utilized in the practice of this invention. In the preferred embodiment of the invention a small but effective amount is utilized, usually between about 0.01 and 0.5 percent by weight of the phosphorus-containing compound being deemed sufficient. Among these catalysts are included metal alcoholates and phenolates. It is preferred, however, to utilize the alkaline metal salts of an alcohol or phenol. Typical examples are sodium methylate, lithium methylate, lithium ethylate, potassium methylate, sodium ethylate sodium isopropylate, sodium dodecylate, sodium cetylate, sodium octadecylate, sodium phenolate, potassium phenolate, sodium cresylate, calcium ethylate (a metal alcoholate). Strong organic bases may also be utilized, such as, quaternary ammonium hydroxides, e.g., trimethyl benzyl ammonium hydroxide, substituted guanidines, e.g., pentamethyl guanidines. Strong inorganic bases may also be suitable such as sodium hydroxide and potassium hydroxide.

The alcohols which may be suitable in the practice of this invention are methyl, ethyl, propyl, isopropyl, butyl, isobutyl, heptyl and hexyl alcohols. It is to be understood that the separation of the trialkyl phosphite may differ in accordance with the alcohol being formed. However, higher yields of the desired phosphite may be obtained utilizing the process of this invention. In the preferred embodiment trimethyl, triethyl, or triisopropyl phosphite is separated from its corresponding alcohol in the product column 28 which may be maintained at a temperature of between about 50 and 125 degrees centigrade under subatmospheric pressures.

The following examples illustrate the invention, but are not to be interpreted as limiting it in any respect. All parts are by weight and temperatures in degrees centigrade unless otherwise stated.

Example 1

6,801 parts of ethanol were passed into a reaction zone together with 262 parts of sodium catalyst. 3.7 percent of this catalyst was sodium and the remainder was alcohol, i.e., ethyl alcohol. Triphenyl phosphite (4,200 parts) was passed into the reaction zone together with the catalyst and ethanol. The reaction zone was maintained at atmospheric pressure and a temperature of about 90 degrees centigrade. The reaction product was conveyed to a separating zone which was maintained at a temperature of between about 103 and 108 degrees centigrade at 45 mm. absolute pressure. A catalyst residue of 264 parts was recovered from this separating column. The vapor stream was carried over to a stripping column which was maintained at between about 27 and 105 degrees centigrade at 45 mm. absolute pressure. 2,135 parts of triethyl phosphite were recovered from this column. The phenol which was separated in the stripping column was then passed through a phenol column where 3,649 parts were recovered. The phenol column was maintained at a temperature of between 75 and 125 degrees centigrade at from 11 to 16 mm. absolute pressure. The above results show that about 91 percent triethyl phosphite is recoverable by known techniques. The weight ratio of ethanol to triethyl phosphite in the distillate varied from about 2:1 to about 4:1.

Example 2

This example illustrates the batch technique for preparing triethyl phosphite. Triphenyl phosphite (154 grams), ethanol (138 grams), and sodium (0.5 gram) were added to a reaction vessel, and the vessel and its contents were heated to a temperature of about 100 degrees centigrade, while the reactants were being agitated. While the reactants were maintained at a temperature of about 100 degrees centigrade, a total of 4,190 milliliters of ethanol were added to the reaction flask during a period of about ten hours and forty-five minutes and as the reaction progressed, a gaseous mixture of ethanol and triethyl phosphite passed through a water cooled condenser, and collected in a product vessel. Distillate was collected at one-half hour intervals and analyzed for phosphorus by flame spectraphotometer and for phosphite by titration with a standard iodine solution. About 78 percent of the phosphorus initially charged to the reaction vessel as triphenyl was recovered in the product flask as triethyl phosphite; the weight ratio of ethanol to triethyl phosphite in the distillate varied from about 26:1 to about 106:1.

Example 1 as compared with Example 2 shows the greater conversion to the desired phosphite which results from the practice of this invention. It is, therefore, obvious that other means for removing the reactants from the catalyst such as by neutralization of the catalyst or by an ion exchange membrane and so forth, also will give improved results.

Example 3

The process of Example 1 was repeated except that in addition to triphenyl phosphite, recycle byproducts of diethylphenyl phosphite, ethyldiphenyl phosphite, and triphenyl phosphite, which were recovered from the stripping column, were recycled to the reaction zone and ethanol, which was recovered from the product column, also was recycled to the reaction zone. The yield obtained by this process increased the overall yield of triethylphosphite recoverable to about 95 percent.

Example 4

Triisopropyl phosphite was prepared in a manner similar to that used to prepare triethyl phosphite as described in Example 1. Isopropanol, triphenyl phosphite and sodium (in the ratio of 15 moles of 2 moles to 0.087 mol) were passed to a vaporizer maintained at about 126 degrees centigrade and about 45 mm. of mercury pressure. During this time the effluent from the vaporizer was subjected to continuous distillation at a pressure of 45–59 mm. of mercury, and 521 parts of distillate were collected at a vapor temperature of between 41 and 43 degrees centigrade. The distillate was analyzed by gas chromatography and found to contain a component other than isopropanol in an amount representing about 5 percent. Phosphorus assays (iodometric and flame spectrophotometric) showed the presence of a trivalent phosphorus compound in an amount equal to about 5 percent (calculated as $(C_3H_7O)_3P$). Distillation of this material led to the recovery of a fraction with a melting point of 65.5–67 degrees centigrade at 10 mm. pressure, which was identified by infrared analysis as containing 85 percent triisopropyl phosphite.

Example 5

Triphenyl phosphite (3,559 parts), and a recycle byproducts stream from a previous run comprising at least dimethylphenyl phosphite, diphenylmethyl phosphite, and triphenyl phosphite (203 parts) were added to a feed tank. Methanol (1,220 parts), sodium methylate (13.3 parts by weight) and recycled methanol (2,832 parts) were added to a second feed tank. About 157 parts by weight per hour and 170 parts by weight per hour from the first and second tanks, respectively, were fed into a reaction zone maintained at about between 60 and 65 degrees centigrade. After leaving the reaction zone, the mixture was continuously "flashed" into the vaporizer, which was maintained at a pressure of about forty-five millimeters of mercury absolute at a temperature of between about 95 and 100 degrees centigrade, and wherein a substantially total flash vaporization of trimethyl phosphite, methanol, phenol and trivalent phosphorus-containing compounds other than trimethyl phosphite occurs, which are taken off in an overhead vapor stream. A very small quantity of vaporization residue, which is a highly concentrated mixture of essentially nonvolatile, non-reusable byproducts, is withdrawn from the vaporizer as a bottom stream and is discarded.

Distillate from the methanol stripping column was continuously fed to the product column. This distillate had an average composition of about thirty-seven weight percent of trimethyl phosphite in methanol and contained small amounts of anisole and miscellaneous impurities. The product column was operated at atmospheric pressure. Under this pressure, the temperature in the top of the product column was about sixty-six degrees centigrade, and the bottom temperature was about one hundred and ten to one hundred and twelve degrees centigrade. Distillate from the product column was recovered at the rate of about one hundred and twenty-six parts by weight per hour, and was used together with fresh methanol to make the methanolic feed material in the said second feed tank. The methanolic distillate from the product column had a trimethyl phosphite content of about six weight percent. The bottom stream from the product column was withdrawn at a rate of about fifty-four parts by weight per hour. The withdrawal rate was based upon maintaining a constant level in the "pot" of the product column. This bottom stream material averaged about ninety-eight weight percent of trimethyl phosphite, with the remainder being mostly anisole and pentavalent phosphorus-containing impurities. Trimethyl phosphite of greater than about ninety-nine weight percent purity was continuously recovered by distilling this product column bottom stream at about two hundred and fifty millimeters of mercury absolute pressure, while using continuous distillation techniques.

The bottom stream from the methanol stripping column was continuously fed to the phenol column. The phenol column was operated under an absolute pressure of about five millimeters of mercury. A "pot" temperature of about one hundred and fourteen degrees centigrade was maintained in the phenol column, and the temperature in the top portion of the column was about sixty to seventy degrees centigrade. Phenol of about ninety-eight percent purity was obtained as a distillate from the column at a rate of about one hundred and twenty-one parts by weight per hour. Anisole was the main impurity in this recovered phenol. The bottom stream from the phenol column was withdrawn to maintain a constant "pot" level. The rate of bottom stream withdrawal was about 9.6 parts by weight per hour. The bottom stream was employed, together with fresh triphenyl phosphite, to prepare the phosphorus-containing feed materials in the said first feed tank. The phenol column bottom stream consisted essentially of trivalent phosphorus-containing compounds and phenol. The trivalent phosphorus content of this stream was the calculated molar equivalent to about sixty weight percent diphenyl methyl phosphite.

For the twenty-four hour operating period described above the overall yield of trimethyl phosphite from triphenyl phospsite was about ninety percent, and about eighty-eight percent of the theoretically possible amount of phenol was recovered. During the operation of the process as described above, there were no signs of any problems which would have prohibited further continuous operation.

Example 6

The reaction of Example 5 is repeated, using the same amounts of reactants and the same reaction conditions. However, instead of employing flash vaporizing to separate the volatiles from the catalyst plus nonvolatile byproduct parts of the reaction mixture, these are separated by heating to about the boiling point of phenol, e.g., about 5 mm. Hg pressure at 125° C. The separation is effected quickly, within one minute by heating a small enough portion of reaction mixture, at one time, and the subsequent separations are effected as in Example 5. The product made is of similar high quality.

Example 7

The reactions of Examples 1–4 are repeated, using the molar equivalent of methanol, in place of the ethanol and isopropanol mentioned. The reaction is effected at 60 degrees to 65 degrees centigrade and vaporized to separate from the catalyst at 95 to 100 degrees centigrade. Further minor adjustments in subsequent separations are made to produce best purification of the desired trimethyl phosphite, which is obtained in comparable high purity and good yield.

The examples illustrate the making of trialkyl phosphites by total vaporization of the volatile products of a transesterification reaction from the catalyst and nonvolatile byproducts. Although continuous flash vaporization methods are highly desirable, other processes described are also satisfactory and it is contemplated that nonflash methods, using conventional vaporization techniques, may also be employed, and may be preferred in some instances.

What is claimed is:

1. A process for preparing a trialkyl phosphite which comprises reacting at a temperature between 15 and 150 degrees centigrade, a compound of the formula

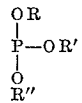

wherein R is phenyl or lower alkyl phenyl, and R' and R" are independently selected from the group consisting of lower alkyl and phenyl, an alkanol of 1 to 7 carbon atoms and an alkaline transesterification catalyst, separating the catalyst and nonvolatile byproducts of the reaction from the rest of the reaction mixture, comprising lower trialkyl phosphite, alkanol, hydroxyaromatic byproduct and tertiary phosphites other than trialkyl phosphite, by vaporization, leaving the catalyst and nonvolatile byproducts of the reaction as a residue, and separating the lower trialkyl phosphite from the other components of the resultant mixture of vaporized materials.

2. A process for preparing trimethyl phosphite which comprises reacting a compound of the formula

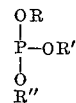

wherein R is phenyl, and R' and R" are independently selected from the group consisting of methyl and phenyl, methanol and an alkaline transesterification catalyst, separating the catalyst and nonvolatile byproducts of the reaction from the rest of the reaction mixture, comprising trimethyl phosphite, methanol, hydroxyaromatic byproduct and tertiary phosphites other than trimethyl phosphite, by vaporization, leaving the catalyst and nonvolatile byproducts of the reaction as a residue and separating the trimethyl phosphite from the other components of the resultant mixture of vaporized materials.

3. A process according to claim 2 in which the reaction is effected at a temperature between 15° centigrade and the boiling point of the trimethyl phosphite.

4. A process according to claim 3 wherein R, R' and R" are phenyl and the catalyst and nonvolatile byproducts of the reaction are separated from the rest of mixture, at a temperature of between about 20 and 150 degrees centigrade and a pressure of between 1 and 750 millimeters of mercury absolute pressure, leaving the catalyst and nonvolatile byproducts of the reaction as a residue.

5. A process according to claim 3 wherein the components of the resultant mixture of vaporized materials, other than the trimethyl phosphite separated therefrom are returned to a reaction mixture in which

and methanol are being reacted in the presence of an alkaline transesterification catalyst to form a trimethyl phosphite.

6. A process according to claim 3 wherein the vaporization separation is by heating the reaction mixture to drive off the volatile constituents thereof, leaving behind the catalyst and non-volatile byproducts.

7. A process according to claim 2 wherein an excess of methanol is employed.

8. A process for preparing trimethyl phosphite which comprises reacting at a temperature between 15 and 150 degrees centigrade, a compound of the formula

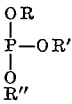

wherein R is phenyl, R' and R" are independently selected from the group consisting of methyl and phenyl, methanol and an alkaline transesterification catalyst, separating the catalyst and non-volatile byproducts of the reaction from the rest of the reaction mixture, comprising trimethyl phosphite, methanol, hydroxyaromatic byproduct and tertiary phosphites other than trimethyl phosphite, by total vaporization of said rest of the reaction mixture, leaving the catalyst and non-volatile byproducts of the reaction as a residue, and separating the trimethyl phosphite from the other components of the resultant mixture of vaporized materials.

9. A process according to claim 8 wherein the methanol is employed in excess and the total vaporization is effected at a temperature within the range of 20 to 125 degrees centigrade at a pressure from 25 to 200 millimeters of mercury.

10. A process according to claim 9 wherein the phosphite reactant is triphenyl phosphite, the catalyst is an alkaline alcoholate, the transesterification reaction is effected at 60 degrees to 65 degrees centigrade and the total vaporization is effected at 95 degrees to 100 degrees centigrade.

References Cited

UNITED STATES PATENTS

| 2,970,166 | 1/1961 | Rosin et al. | 260—982 |
| 3,201,435 | 8/1965 | Schulz | 260—982 |
| 3,337,657 | 8/1967 | Schulz | 260—982 |

CHARLES B. PARKER, *Primary Examiner.*

ANTON H. SUTTO, *Assistant Examiner.*

U.S. Cl. X.R.

260—967